United States Patent
Koo et al.

(10) Patent No.: US 7,913,857 B2
(45) Date of Patent: Mar. 29, 2011

(54) SELECTIVE MEMBRANE HAVING A HIGH FOULING RESISTANCE

(75) Inventors: Ja-Young Koo, Billerica, MA (US); Sung Pyo Hong, Kyungbuk (KR); Jong Hwa Lee, Seoul (KR); Kwan Young Ryu, Seoul (KR)

(73) Assignee: Woongjin Chemical Co., Ltd., Gyeongsangbuk-Do (KR)

( * ) Notice: Subject to any disclaimer, the term of this patent is extended or adjusted under 35 U.S.C. 154(b) by 1073 days.

(21) Appl. No.: 11/702,917

(22) Filed: Feb. 6, 2007

(65) Prior Publication Data

US 2007/0175821 A1 Aug. 2, 2007

Related U.S. Application Data

(63) Continuation-in-part of application No. 11/345,192, filed on Feb. 1, 2006, now Pat. No. 7,537,697.

(51) Int. Cl.
 *B01D 39/00* (2006.01)
 *B01D 39/14* (2006.01)
 *B01D 29/46* (2006.01)
 *B01D 67/00* (2006.01)

(52) U.S. Cl. .............. 210/500.38; 210/490; 210/500.27; 210/500.37; 264/48

(58) Field of Classification Search ............. 210/500.27, 210/500.37, 500.38, 490; 427/245; 264/41, 264/48–49
See application file for complete search history.

(56) References Cited

U.S. PATENT DOCUMENTS

| | | | |
|---|---|---|---|
| 4,277,344 A | 7/1981 | Cadotte | |
| 4,720,345 A * | 1/1988 | Linder et al. | 210/650 |
| 4,830,885 A | 5/1989 | Tran et al. | |
| 4,872,984 A | 10/1989 | Tomaschke | |
| 4,950,404 A | 8/1990 | Chau | |
| 4,983,291 A | 1/1991 | Chau et al. | |
| 5,178,766 A | 1/1993 | Ikeda et al. | |
| 5,576,057 A | 11/1996 | Hirose et al. | |
| 5,614,099 A | 3/1997 | Hirose et al. | |
| 5,755,964 A * | 5/1998 | Mickols | 210/500.37 |
| 6,015,495 A | 1/2000 | Koo et al. | |
| 6,063,278 A | 5/2000 | Koo et al. | |
| 6,177,011 B1 | 1/2001 | Hachisuka et al. | |
| 6,245,234 B1 | 6/2001 | Koo et al. | |
| 6,280,853 B1 | 8/2001 | Mickols | |
| 6,565,749 B1 * | 5/2003 | Hou et al. | 210/500.38 |
| 6,780,327 B1 * | 8/2004 | Wu et al. | 210/660 |
| 6,851,561 B2 * | 2/2005 | Wu et al. | 210/490 |
| 6,913,694 B2 | 7/2005 | Koo et al. | |
| 7,094,347 B2 * | 8/2006 | Wu et al. | 210/321.84 |
| 7,537,697 B2 * | 5/2009 | Koo et al. | 210/500.38 |

* cited by examiner

*Primary Examiner* — Ana M Fortuna
(74) *Attorney, Agent, or Firm* — Kriegsman & Kriegsman

(57) ABSTRACT

A selective membrane having a high fouling resistance. In one embodiment, the selective membrane is a composite polyamide reverse osmosis membrane in which a hydrophilic coating is applied to the polyamide layer of the membrane, the hydrophilic coating being made by covalently bonding a hydrophilic compound to residual acid chlorides of the polyamide membrane, the hydrophilic compound including (i) at least one reactive group that is adapted to covalently bond directly to the polyamide membrane, the at least one reactive group being at least one of a primary amine and a secondary amine; and (ii) at least one non-terminal hydroxyl group.

24 Claims, No Drawings

SELECTIVE MEMBRANE HAVING A HIGH FOULING RESISTANCE

CROSS-REFERENCE TO RELATED APPLICATIONS

The present application is a continuation-in-part of U.S. patent application Ser. No. 11/345,192, inventors Ja-young Koo, filed Feb. 1, 2006, now U.S. Pat. No. 7,537,697, which is incorporated herein by reference.

BACKGROUND OF THE INVENTION

The present invention relates generally to selective membranes and relates more particularly to selective membranes having a high fouling resistance.

It is known that dissolved substances can be separated from their solvents by the use of various types of selective membranes, such selective membranes including—listed in order of increasing pore size—reverse osmosis membranes, ultrafiltration membranes and microfiltration membranes. One use to which reverse osmosis membranes have previously been put is in the desalination of brackish water or seawater to provide large volumes of relatively non-salty water suitable for industrial, agricultural or home use. What is involved in the desalination of brackish water or seawater using reverse osmosis membranes is literally a filtering out of salts and other dissolved ions or molecules from the salty water by forcing the salty water through a reverse osmosis membrane whereby purified water passes through the membrane while salts and other dissolved ions and molecules do not pass through the membrane. Osmotic pressure works against the reverse osmosis process, and the more concentrated the feed water, the greater the osmotic pressure which must be overcome.

A reverse osmosis membrane, in order to be commercially useful in desalinating brackish water or seawater on a large scale, must possess certain properties. One such property is that the membrane have a high salt rejection coefficient. In fact, for the desalinated water to be suitable for many commercial applications, the reverse osmosis membrane should have a salt rejection capability of at least about 97%. Another important property of a reverse osmosis membrane is that the membrane possess a high flux characteristic, i.e., the ability to pass a relatively large amount of water through the membrane at relatively low pressures. Typically, the flux for the membrane should be greater than 10 gallons/ft$^2$-day (gfd) at a pressure of 800 psi for seawater and should be greater than 15 gfd at a pressure of 220 psi for brackish water. For certain applications, a rejection rate that is less than that which would otherwise be desirable may be acceptable in exchange for higher flux and vice versa.

One common type of reverse osmosis membrane is a composite membrane comprising a microporous support and a thin polyamide film formed on the microporous support. Typically, the polyamide film is formed by an interfacial polymerization of a polyfunctional amine and a polyfunctional acyl halide.

An example of the aforementioned composite polyamide reverse osmosis membrane is disclosed in U.S. Pat. No. 4,277,344, inventor Cadotte, which issued Jul. 7, 1981, and which is incorporated herein by reference. The aforementioned patent describes an aromatic polyamide film which is the interfacial reaction product of an aromatic polyamine having at least two primary amines substituents with an aromatic acyl halide having at least three acyl halide substituents. In the preferred embodiment, a porous polysulfone support is coated with m-phenylenediamine in water. After removal of excess m-phenylenediamine solution from the coated support, the coated support is covered with a solution of trimesoyl chloride dissolved in "FREON" TF solvent (trichlorotrifluoroethane). The contact time for the interfacial reaction is 10 seconds, and the reaction is substantially complete in 1 second. The resulting polysulfone/polyamide composite is then air-dried.

Although the Cadotte membrane described above exhibits good flux and good salt rejection, various approaches have been taken to further improve the flux and salt rejection of composite polyamide reverse osmosis membranes. In addition, other approaches have been taken to improve the resistance of said membranes to chemical degradation and the like. Many of these approaches have involved the use of various types of additives to the solutions used in the interfacial polycondensation reaction.

For example, in U.S. Pat. No. 4,872,984, inventor Tomaschke, which issued Oct. 10, 1989, and which is incorporated herein by reference, there is disclosed an aromatic polyamide membrane formed by (a) coating a microporous support with an aqueous solution comprising (i) an essentially monomeric, aromatic, polyamine reactant having at least two amine functional groups and (ii) a monofunctional, monomeric (i.e., polymerizable) amine salt to form a liquid layer on the microporous support, (b) contacting the liquid layer with an organic solvent solution of an essentially monomeric, aromatic, amine-reactive reactant comprising a polyfunctional acyl halide or mixture thereof, wherein the amine-reactive reactant has, on the average, at least about 2.2 acyl halide groups per reactant molecule, and (c) drying the product of step (b), generally in an oven at about 60° C. to 110° C. for about 1 to 10 minutes, so as to form a water permeable membrane.

Other patents disclosing the use of additives in the solutions employed in the interfacial polycondensation reaction include: U.S. Pat. No. 4,983,291, inventors Chau et al., which issued Jan. 8, 1991; U.S. Pat. No. 5,576,057, inventors Hirose et al., which issued Nov. 19, 1996; U.S. Pat. No. 5,614,099, inventors Hirose et al., which issued Mar. 25, 1997; U.S. Pat. No. 4,950,404, inventor Chau, which issued Aug. 21, 1990; U.S. Pat. No. 4,830,885, inventors Tran et al., which issued May 16, 1989; U.S. Pat. No. 6,245,234, inventors Koo et al., which issued Jun. 12, 2001; U.S. Pat. No. 6,063,278, inventors Koo et al., which issued May 16, 2000; and U.S. Pat. No. 6,015,495, inventors Koo et al., which issued Jan. 18, 2000, all of which are incorporated herein by reference.

Another approach which has been taken to improve the performance of a composite polyamide reverse osmosis membrane is disclosed in U.S. Pat. No. 5,178,766, inventors Ikeda et al., which issued Jan. 12, 1993, and which is incorporated herein by reference. According to Ikeda et al., the salt rejection rate of a composite polyamide reverse osmosis membrane is said to be improved by covalently bonding to the polyamide film of said membrane a compound having a quaternary nitrogen atom. Said quaternary nitrogen atom-containing compound is bonded to the polyamide film through a reactive group present in the compound, said reactive group being an epoxy group, an aziridine group, an episulfide group, a halogenated alkyl group, an amino group, a carboxylic group, a halogenated carbonyl group, or a hydroxy group.

One problem encountered by many of the various composite polyamide reverse osmosis membranes described above is fouling, i.e., the undesired adsorption of solutes to the membrane, thereby causing a reduction in flux exhibited by the membrane. Fouling is typically caused by hydrophobic-hydrophobic and/or ionic interactions between the polyamide film of the membrane and those solutes present in the solution being filtered. As can readily be appreciated, fouling is undesirable not only because it results in a reduction in flux performance for the membrane but also because it requires that operating pressures be varied frequently to compensate for the variations in flux experienced during said reduction. In addition, fouling also requires that the membrane be cleaned frequently.

One approach to the problem of fouling is disclosed in U.S. Pat. No. 6,177,011, inventors Hachisuka et al., which issued Jan. 23, 2001, and which is incorporated herein by reference. According to Hachisuka et al., fouling can be reduced by coating the polyamide film of the membrane with at least one substance selected from the group consisting of an electrically neutral organic substance and a polymer that has a nonionic hydrophilic group, said organic substance or polymer preferably being a polyvinyl alcohol.

Another approach to the problem of fouling is disclosed in U.S. Pat. No. 6,280,853, inventor Mickols, which issued Aug. 28, 2001, and which is incorporated herein by reference. Mickols discloses a composite membrane that is said to have an improved resistance to fouling, said composite membrane comprising a porous support and a crosslinked polyamide surface having polyalkylene oxide groups grafted thereto.

Still another approach to the problem of fouling is disclosed in U.S. Pat. No. 6,913,694, inventors Koo et al., which issued Jul. 5, 2005, and which is incorporated herein by reference. Koo et al. discloses a selective membrane having a high fouling resistance. In one embodiment, the selective membrane is a composite polyamide reverse osmosis membrane in which a hydrophilic coating has been applied to the polyamide layer of the membrane, the hydrophilic coating being made by (i) applying to the membrane a quantity of a polyfunctional epoxy compound, the polyfunctional epoxy compound comprising at least two epoxy groups, and (ii) then, cross-linking the polyfunctional epoxy compound in such a manner as to yield a water-insoluble polymer.

SUMMARY OF THE INVENTION

It is an object of the present invention to provide a novel composite polyamide reverse osmosis membrane.

It is another object of the present invention to provide a membrane as described above that possesses high fouling resistance.

Accordingly, in furtherance of the above objects, as well as other objects to be described herein or to become apparent from the description that follows, there is provided a composite polyamide reverse osmosis membrane, said composite polyamide reverse osmosis membrane comprising (a) a microporous support; (b) a polyamide layer on said microporous support; and (c) a hydrophilic coating on said polyamide layer, said hydrophilic coating being formed by covalently bonding a hydrophilic compound to the polyamide membrane, wherein said hydrophilic compound includes (i) at least one reactive group adapted to covalently bond directly to the polyamide membrane, said at least one reactive group being at least one of a primary amine and a secondary amine; and (ii) at least one non-terminal hydroxyl group.

The aforementioned hydrophilic compound may be, for example, a reaction product of an epoxide and at least one of ammonia or a derivative thereof. Examples of such an epoxide include, but are not limited to, glycidol, butadiene diepoxide, ethylene glycol diglycidyl ether, 1,3-propanediol diglycidyl ether, 1,4-butanediol diglycidyl ether, 1,5-pentanediol diglycidyl ether, 1,6-hexanediol diglycidyl ether, 1,4-cyclohexanedimethanol diglycidyl ether, 1,4-cyclohexanediol diglycidyl ether, 1,3-cyclohexanediol diglycidyl ether, glycerol diglycidyl ether, glycerol triglycidyl ether, diglycerol polyglycidyl ether, polyglycerol polyglycidyl ether, 1,1,1-tris(hydoxymethyl)ethane triglycidyl ether, 1,1,1-tris(hydroxymethyl)ethane diglycidyl ether, trimethylolpropane diglycidyl ether, trimethylolpropane triglycidyl ether, phloroglucinol triglycidyl ether, pyrogallol triglycidyl ether, cyanuric acid triglycidyl ether, pentaerythritol tetra glycidyl ether, sorbitol tetraglycidyl ether, hydroquinone diglycidyl ether, resorcinol diglycidyl ether, bisphenol A diglycidyl ether, poly(ethylene glycol)diglycidyl ether, and poly(propylene glycol)diglycidyl ether. The aforementioned ammonia derivative may include, but is not limited to, amine compounds having at least one functional group selected from the group consisting of an alkyl group (e.g., a methyl group, an ethyl group, a propyl group, a butyl group, a pentyl group, a hexyl group, a heptyl, an octyl group, a cycloalkyl group (e.g., a cyclohexyl group)), an allyl group, a benzyl group, a phenyl group, a hydroxyl group, a carbonyl group, a nitrile group, a trialkoxysilane group, an anionic group, a tertiary amine group, and a polyalkylene oxide group.

The present invention is also directed to a method of producing the above-described composite polyamide reverse osmosis membrane.

The present invention is further directed to microfiltration membranes and ultrafiltration membranes that include the high fouling resistance coating of the present invention, as well as to a method of making such coated membranes.

Additional objects, features, aspects and advantages of the present invention will be set forth, in part, in the description which follows and, in part, will be obvious from the description or may be learned by practice of the invention. Certain embodiments of the invention will be described hereafter in sufficient detail to enable those skilled in the art to practice the invention, and it is to be understood that other embodiments may be utilized and that structural or other changes may be made without departing from the scope of the invention. The following detailed description is, therefore, not to be taken in a limiting sense, and the scope of the present invention is best defined by the appended claims.

DETAILED DESCRIPTION OF PREFERRED EMBODIMENTS

As noted above, the present invention is based on the unexpected discovery that the fouling resistance of a selective membrane, such as a composite polyamide reverse osmosis membrane, a microfiltration membrane or an ultrafiltration membrane, can be significantly increased by applying to the membrane a hydrophilic coating of the type described below.

The composite polyamide reverse osmosis membrane to which the hydrophilic coating of the present invention is applied may be virtually any composite polyamide reverse osmosis membrane of the type comprising a porous support and a polyamide film disposed on said porous support.

The aforementioned porous support is typically a microporous support. The particular microporous support employed is not critical to the present invention but is generally a polymeric material containing pore sizes which are of sufficient size to permit the passage of permeate therethrough but not large enough so as to interfere with the bridging over of the ultrathin membrane formed thereon. The pore size of the support will generally range from 1 to 500 nanometers inasmuch as pores which are larger in diameter than 500 nanometers will permit the ultrathin film to sag into the pores, thus disrupting the flat sheet configuration desired. Examples of microporous supports useful in the present invention include those made of a polysulfone, a polyether sulfone, a polyimide, a polyamide, a polyetherimide, polyacrylonitrile, poly(methyl methacrylate), polyethylene, polypropylene and various halogenated polymers, such as polyvinylidene fluoride. Additional microporous support materials may be found in the patents incorporated herein by reference.

The thickness of the microporous support is not critical to the present invention. Generally, the thickness of the microporous support is about 25 to 125 μm, preferably about 40 to 75 μm.

The polyamide film of the present invention is typically the interfacial reaction product of a polyfunctional amine reactant and a polyfunctional amine-reactive reactant. The polyfunctional amine reactant employed in the present invention is preferably an essentially monomeric amine having at least two amine functional groups, more preferably 2 to 3 amine functional groups. The amine functional group is typically a primary or secondary amine functional group, preferably a primary amine functional group. The particular polyamine employed in the present invention is not critical thereto and may be a single polyamine or a combination thereof. Examples of suitable polyamines include aromatic primary diamines, such as meta-phenylenediamine and para-phenylenediamine and substituted derivatives thereof, wherein the substituent includes, e.g., an alkyl group, such as a methyl group or an ethyl group, an alkoxy group, such as a methoxy group or an ethoxy group, a hydroxy alkyl group, a hydroxyl group or a halogen atom. Additional examples of suitable polyamines include alkanediamines, such as 1,3-propanediamine and its homologs with or without N-alkyl or aryl substituents, cycloaliphatic primary diamines, cycloaliphatic secondary diamines, such as piperazine and its alkyl derivatives, aromatic secondary amines, such as N,N'-dimethyl-1, 3-phenylenediamine, N,N'-diphenylethylene diamine, benzidine, xylylene diamine and derivatives thereof. Other suitable polyamines may be found in the patents incorporated herein by reference. The preferred polyamines of the present invention are aromatic primary diamines, more preferably m-phenylenediamine, and piperazine. (A composite polyamide reverse osmosis membrane made using piperazine as the polyfunctional amine reactant falls within a subclass of composite polyamide reverse osmosis membranes known as nanofiltration membranes. Nanofiltration membranes have larger "pores" than other composite polyamide reverse osmosis membranes and exhibit a low rejection rate of monovalent salts while exhibiting a high rejection rate of divalent salts and organic materials having a molecular weight greater than 300. Nanofiltration membranes are typically used to remove calcium and magnesium salts from water, i.e., to soften hard water, and to remove natural organic matter, such as humic acids from decaying plant leaves, from water. Humic acid is negatively charged at a pH above 6 and can be adsorbed on the membrane through hydrophobic interactions with the membrane surface.)

The polyfunctional amine reactant is typically present in an aqueous solution in an amount in the range of from about 0.1 to 20%, preferably 0.5 to 8%, by weight, of the aqueous solution. The pH of the aqueous solution is in the range of from about 7 to 13. The pH can be adjusted by the addition of a basic acid acceptor in an amount ranging from about 0.001% to about 5%, by weight, of the solution. Examples of the aforementioned basic acid acceptor include hydroxides, carboxylates, carbonates, borates, phosphates of alkali metals, and trialkylamines.

In addition to the aforementioned polyfunctional amine reactant (and, if desired, the aforementioned basic acid acceptor), the aqueous solution may further comprise additives of the type described in the patents incorporated herein by reference, such additives including, for example, polar solvents, amine salts and polyfunctional tertiary amines (either in the presence or absence of a strong acid).

The polyfunctional amine-reactive reactant employed in the present invention is one or more compounds selected from the group consisting of a polyfunctional acyl halide, a polyfunctional sulfonyl halide and a polyfunctional isocyanate. Preferably, the polyfunctional amine-reactive reactant is an essentially monomeric, aromatic, polyfunctional acyl halide, examples of which include di- or tricarboxylic acid halides, such as trimesoyl chloride (TMC), isophthaloyl chloride (IPC), terephthaloyl chloride (TPC) and mixtures thereof. Examples of other polyfunctional amine-reactive reactants are disclosed in the patents incorporated herein by reference.

The polyfunctional amine-reactive reactant is typically present in an organic solvent solution, the solvent for said organic solvent solution comprising any organic liquid immiscible with water. The polyfunctional amine-reactive reactant is typically present in the organic liquid in an amount in the range of from about 0.005 to 5 wt % preferably 0.01 to 0.5 wt % of the solution. Examples of the aforementioned organic liquid include hexane, cyclohexane, heptane, alkanes having from 8 to 12 carbon atoms, and halogenated hydrocarbons, such as the FREON series. Other examples of the above-described organic liquid may be found in the patents incorporated herein by reference. Preferred organic solvents are alkanes having from 8 to 12 carbon atoms and mixtures thereof. ISOPAR® solvent (Exxon Corp.) is such a mixture of alkanes having from 8 to 12 carbon atoms.

The hydrophilic coating of the present invention is formed by covalently bonding a hydrophilic compound to residual acid chlorides of the polyamide membrane, said hydrophilic compound comprising (i) at least one reactive group that is adapted to covalently bond directly to the polyamide membrane, said at least one reactive group being at least one of a primary amine and a secondary amine, and (ii) at least one non-terminal hydroxyl group.

The aforementioned hydrophilic compound may be, for example, a reaction product of an epoxide and at least one of ammonia and an ammonia derivative. Examples of suitable epoxides include, but are not limited to, glycidol, butadiene diepoxide, ethylene glycol diglycidyl ether, 1,3-propanediol diglycidyl ether, 1,4-butanediol diglycidyl ether, 1,5-pentanediol diglycidyl ether, 1,6-hexanediol diglycidyl ether, 1,4-cyclohexanedimethanol diglycidyl ether, 1,4-cyclohexanediol diglycidyl ether, 1,3-cyclohexanediol diglycidyl ether, glycerol diglycidyl ether, glycerol triglycidyl ether, diglycerol polyglycidyl ether, polyglycerol polyglycidyl ether, 1,1,1-tris(hydoxymethyl)ethane triglycidyl ether, 1,1, 1-tris(hydroxymethyl)ethane diglycidyl ether, trimethylolpropane diglycidyl ether, trimethylolpropane triglycidyl ether, phloroglucinol triglycidyl ether, pyrogallol triglycidyl ether, cyanuric acid triglycidyl ether, pentaerythritol tetra glycidyl ether, sorbitol tetraglycidyl ether, hydroquinone diglycidyl ether, resorcinol diglycidyl ether, bisphenol A diglycidyl ether, poly(ethylene glycol)diglycidyl ether, and poly (propylene glycol)diglycidyl ether.

The hydrophilic compound of the present invention may include a plurality of non-terminal hydroxyl groups. Alternatively, the hydrophilic compound of the present invention may include a combination of terminal and non-terminal hydroxyl groups or may include only a single non-terminal hydroxyl group. An example of a hydrophilic compound having a single non-terminal hydroxyl group is 1,3-diamino-2-propanol.

The ammonia derivative that may be reacted with an epoxide compound to form the hydrophilic compound of the present invention may be, for example, a primary amine compound of the formula R—NH$_2$ wherein R is selected from the group consisting of an alkyl group (such as a methyl group, an ethyl group, a propyl group, a butyl group, a pentyl group, a hexyl group, a heptyl, an octyl group, a cycloalkyl group (e.g., a cyclohexyl group)), an allyl group, a benzyl group, a phenyl group, a hydroxyl group, a carbonyl group, a nitrile group, a trialkoxysilane group, an anionic group, a tertiary amine group, and a polyalkylene oxide group.

Examples of such primary amines containing one or more alkyl groups include, but are not limited to, methylamine, ethylamine, propylamine, and butylamine.

Examples of such primary amines containing one or more hydroxyl groups include, but are not limited to, ethanolamine, 2-amino-1-propanol, 3-amino-1-propanol, 2-amino-1-butanol, 4-amino-1-butanol, 2-amino-1-pentanol, 6-amino-1-pentanol, 2-amino 1-hexanol, 6-amino-1-hexanol, aminophenol, 1,3-diamino-2-propanol, 2,3-dihydroxy-1,4-butanediamine, 3-amino-1,2-propanediol, glucamine, and tris(hydroxymethyl)aminomethane.

Examples of such primary amines containing one or more carbonyl groups include, but are not limited to, aminoacetaldehyde diethyl acetal, aminoacetaldehyde dimethyl acetal, 4-aminobutyraldehyde diethyl acetal, α-aminobutyrolactone, 3-aminobenzamide, 4-aminobenzamide, and N-(3-aminopropyl)-2-pyrrolidinone.

Examples of such primary amines containing one or more nitrile groups include, but are not limited to, aminoacetonitrile, 2-aminobenzonitrile, 3-aminobenzonitrile, and 4-aminobenzonitrile.

Examples of such primary amines containing one or more trialkoxysilane groups include, but are not limited to, (3-aminopropyl)triethoxysilane and (3-aminopropyl)trimethoxysilane.

Examples of such primary amines containing one or more anionic groups include, but are not limited to, glycine, taurine, 3-aminopropanoic acid, 3-amino-1-propanesulfonic acid, 4-amino-1-butanesulfonic acid, 2-aminoethyl hydrogen sulfate, 3-aminobenzenesulfonic acid, 3-amino-4-hydroxybenzenesulfonic acid, 4-aminobenzenesulfonic acid, 3-aminopropylphosphonic acid, 3-amino-4-hydroxybenzoic acid, 4-amino-3-hydroxybenzoic acid, 6-aminohexanoic acid, 3-aminobutanoic acid, 4-amino-2-hydroxybutyric acid, 4-aminobutyric acid, and glutamic acid.

Examples of such primary amines containing one or more tertiary amine groups include, but are not limited to, 3-(dimethylamino)propylamine, 3-(diethylamino)propylamine, 4-(2-aminoethyl)morpholine, 1-(2-aminoethyl)piperazine, 3,3'-diamino-N-methyldipropylamine and 1-(3-aminopropyl)imidazole.

Another type of ammonia derivative that may be reacted with an epoxide compound to form the hydrophilic compound of the present invention is the reaction products of a poly(ethylene glycol) diglycidyl ether or a poly(propylene glycol) diglycidyl ether with ammonia or an ammonia derivative. These reaction products are generally polyalkylene oxide compounds having a linear structure represented by the following formula:

RNH—CH$_2$—CH(OH)—CH$_2$O—(CH(CH$_3$))$_m$—CH$_2$-O)$_n$—CH$_2$—CH(OH)—CH$_2$—NHR wherein R is hydrogen or an alkyl or alkenyl group or an aryl group having from 1 to 8 carbon atoms (R preferably being hydrogen, methyl or ethyl) or can contain other functional groups selected from the group consisting of a hydroxyl group, a carbonyl group, a nitrile group, a trialkoxysilane group, an anionic group, and a tertiary amino group, wherein n is an integer ranging from 1 to 2000 when m is 0; and wherein n is an integer ranging from 1 to 200 when m is 1.

The hydrophilic compound described above is covalently bonded to the residual acid chlorides of the polyamide membrane by contacting the polyamide membrane with an aqueous solution comprising the hydrophilic compound. The hydrophilic compound is typically present in the aqueous solution in an amount ranging from about 0.0001 wt % to 8 wt % of the aqueous solution, preferably about 0.001 wt % to 4 wt % of the aqueous solution.

In accordance with the teachings of the present invention, a composite polyamide reverse osmosis membrane having a high fouling resistance may be made as follows: First, the above-described porous support is coated with the above-described aqueous solution utilizing either a hand coating or a continuous operation, and the excess solution is removed from the support by rolling, sponging, air knifing or other suitable techniques. Following this, the coated support material is then contacted, for example, by dipping or spraying, with the above-described organic solvent solution and allowed to remain in place for a period of time in the range of from about 5 seconds to about 10 minutes, preferably about 20 seconds to 4 minutes. The resulting product is then dried at a temperature below 50° C., preferably by air-drying at room temperature, for about 1 minute. The hydrophilic coating of the present invention is then formed on the polyamide membrane by contacting, for example, by dipping or by spraying, the thus-formed polyamide membrane with an aqueous solution of the above-described hydrophilic compound for a period in the range of about 5 seconds to about 10 minutes, preferably about 20 seconds to 4 minutes, at a temperature of about room temperature to 95° C., whereby said hydrophilic compound covalently bonds to the polyamide membrane through the reaction of the primary or secondary amino group with the residual acid chloride of the polyamide membrane. The resulting product is then rinsed in a basic aqueous solution, such as 0.2% sodium carbonate, from about 1 to 30 minutes at room temperature to 95° C., and then rinsed with deionized water.

Membrane coatings of the present invention that are prepared using hydrophilic compounds having tertiary amino groups may impart an overall positive charge to the membrane. As a result, such coated membranes may possess good fouling resistance to positively charged solutes and, therefore, may be particularly well-suited for treating, for example, water containing positively charged compounds with some hydrophobic character, such as cationic surfactants. By comparison, membrane coatings prepared using hydrophilic compounds having anionic hydrophilic groups may impart an overall negative charge to the membrane. Consequently, such coated membranes may be particularly well-suited for treating, for example, water containing negatively charged solutes. On the other hand, membrane coatings prepared using hydrophilic compounds having uncharged hydrophilic groups, such as hydroxy groups, amide groups and carbonyl groups, result in a more neutrally charged membrane. Consequently, such a coated membrane may be more universally applicable to treating water containing either positively charged or negatively charged matter. In any event, it can be seen from the above discussion that the charge of the membrane coating can be tailored to exhibit high resistance to fouling by variously charged or uncharged solutes.

As noted above, the hydrophilic coating of the present invention is not limited to use with composite polyamide reverse osmosis membranes but can also be applied directly to conventional microporous membranes, such as microfiltration membranes and ultrafiltration membranes, to help resist fouling thereof by proteins, macromolecules and colloids when such membranes are used in surface water treatment, protein separations, and food and beverage processing. A conventional microfiltration membrane is typically a microporous support of the type described above that has a pore size of about 0.1μ-10μ. A conventional ultrafiltration membrane is typically a microporous support of the type described above that has a pore size of about 0.001μ-0.05μ.

The following examples are provided for illustrative purposes only and are in no way intended to limit the scope of the present invention:

EXAMPLE 1

A 140 μm thick microporous polysulfone support including the backing non-woven fabric was soaked in an aqueous solution containing 2 wt % of meta-phenylenediamine (MPD) and 0.2 wt % 2-ethyl-1,3-hexanediol for 40 seconds. The support was drained and nip rolled to remove the excess aqueous solution. Then, the coated support was dipped in 0.1 wt % solution of trimesoyl chloride (TMC) in Isopar® solvent (Exxon Corp.) for 1 minute followed by draining the excess organic solution off the support. The resulting composite membrane was air-dried for about 1 minute and then soaked at room temperature for 2 minutes in 0.05 wt % aqueous solution of the reaction product of ammonia and nona(ethylene glycol)diglycidyl ether reacted in a 2:1 molar ratio, respectively, said reaction product being $NH_2$—$CH_2$—$CH(OH)$—$CH_2O$—$(CH_2$—$CH_2$—$O)_9$—$CH_2$—$CH(OH)$—$CH_2$—$NH_2$ (NONAEG). The resulting product was then rinsed in 0.2% $Na_2CO_3$ aqueous solution for 30 minutes at room temperature, and then rinsed in deionized water.

The initial performance of the membrane was measured by passing an aqueous solution containing 2000 ppm of NaCl through the membrane in a crossflow mode at 225 psi and 25° C. The salt rejection was 99.0% and the flux was 22.5 gfd. The fouling resistance of the membrane was then evaluated under the same conditions described above by further adding 30 ppm dry milk to the feed water at a pH of 6.4. (The protein of dry milk in an aqueous solution may exist as protein molecules and colloids, i.e., aggregates of protein molecules, and can be adsorbed to the membrane through hydrophobic interactions with the membrane surface.) After circulating the feed water through the membrane for 4 hours, the salt rejection was 99.3% and the flux was 22.2 gfd.

EXAMPLE 2

The same procedure as set forth in Example 1 was carried out for Example 2, except that 4,7,10-Trioxa-2,12-dihydroxy-1,13-tridecanediamine, $NH_2$—$CH_2$—$CH(OH)$—$CH_2O$—$(CH_2$—$CH_2$—$O)_2$—$CH_2$—$CH(OH)$—$CH_2$—$NH_2$ (DIEG), was used instead of NONAEG. The performance of the resulting membrane under the same conditions described above for Example 1 is shown below in Table I.

EXAMPLE 3

The same procedure as set forth in Example 1 was carried out for Example 3, except that $NH_2$—$CH_2$—$CH(OH)$—$CH_2O$—$(CH_2$—$CH_2$—$O)_4$—$CH_2$—$CH(OH)$—$CH_2$—$NH_2$ (TETRAEG) was used instead of NONAEG. The performance of the resulting membrane under the same conditions described above for Example 1 is shown below in Table I.

EXAMPLE 4

The same procedure as set forth in Example 1 was carried out for Example 4, except that $NH_2$—$CH_2$—$CH(OH)$—$CH_2O$—$(CH_2$—$CH_2$—$O)_{13}$—$CH_2$—$CH(OH)$—$CH_2$—$NH_2$ (TETRAEG) was used instead of NONAEG. The performance of the resulting membrane under the same conditions described above for Example 1 is shown below in Table I.

EXAMPLE 5

The same procedure as set forth in Example 1 was carried out for Example 5, except that $NH_2$—$CH_2$—$CH(OH)$—$CH_2O$—$(CH_2$—$CH_2$—$O)_{22}$—$CH_2$—$CH(OH)$—$CH_2$—$NH_2$ (N22EG) was used instead of NONAEG. The performance of the resulting membrane under the same conditions described above for Example 1 is shown below in Table I.

EXAMPLE 6

The same procedure as set forth in Example 1 was carried out for Example 6, except that the reaction product of ammonia and glycerol triglycidyl ether (NGLYTR) was used instead of NONAEG. The performance of the resulting membrane under the same conditions described above for Example 1 is shown below in Table I.

EXAMPLE 7

The same procedure as set forth in Example 1 was carried out for Example 7, except that the reaction product of ammonia and sorbitol tetraglycidyl ether (ASORTE) was used instead of NONAEG. The performance of the resulting membrane under the same conditions described above for Example 1 is shown below in Table I.

EXAMPLE 8

The same procedure as set forth in Example 1 was carried out for Example 8, except that the reaction product of aminoacetaldehyde dimethylacetal (AADA) and nona(ethylene glycol) diglycidyl ether, NONAEG-AADA, was used instead of NONAEG. The performance of the resulting membrane under the same conditions described above for Example 1 is shown below in Table I.

EXAMPLE 9

The same procedure as set forth in Example 1 was carried out for Example 9, except that the reaction product of ethanolamine (ELA) and nona(ethylene glycol)diglycidyl ether, NONAEG-ELA, was used instead of NONAEG. The performance of the resulting membrane under the same conditions described above for Example 1 is shown below in Table I.

EXAMPLE 10

The same procedure as set forth in Example 1 was carried out for Example 10, except that the reaction product of (3-aminopropyl)triethoxysilane (APTS) and nona(ethylene glycol)diglycidyl ether, NONAEG-APTS, was used instead of NONAEG. The performance of the resulting membrane under the same conditions described above for Example 1 is shown below in Table I.

EXAMPLE 11

The same procedure as set forth in Example 1 was carried out for Example 11, except that the reaction product of glycine and nona(ethylene glycol)diglycidyl ether, NONAEG-GLY, in the presence of an equivalent amount of sodium hydroxide was used instead of NONAEG. The performance of the resulting membrane under the same conditions described above for Example 1 is shown below in Table I.

COMPARATIVE EXAMPLE 1

The same procedure as set forth in Example 1 was carried out for Comparative Example 1, except that no hydrophilic coating was applied to the composite membrane. The initial salt rejection was 99%, and the initial flux was 27.1 gfd. When subjected to the same fouling conditions of Example 1, the salt rejection was 99.4%, and the flux was 21.2 gfd.

COMPARATIVE EXAMPLE 2

The same procedure as set forth in Example 1 was carried out for Comparative Example 2, except that 4,7,10-trioxa-1,13-tridecanediamine (TOTDA) was used instead of NONAEG. (TOTDA is a diamino polyalkylene oxide compound having no hydroxyl groups.) The performance of the resulting membrane under the same conditions described above for Example 1 is shown below in Table I.

TABLE I

| Membrane | Initial Salt Rejection (%) | Initial Flux (gfd) | Final Flux in the presence of dry milk (gfd) | Flux Decline (%) |
|---|---|---|---|---|
| Example 1 | 99.0 | 22.5 | 22.2 | 1.3 |
| Example 2 | 98.7 | 22.0 | 21.6 | 1.8 |
| Example 3 | 98.6 | 21.8 | 21.6 | 0.9 |
| Example 4 | 98.9 | 21.6 | 21.3 | 1.4 |
| Example 5 | 98.5 | 21.3 | 21.0 | 1.4 |
| Example 6 | 98.6 | 21.4 | 21.0 | 1.9 |
| Example 7 | 98.3 | 23.7 | 22.8 | 3.8 |
| Example 8 | 98.3 | 21.5 | 20.7 | 3.7 |
| Example 9 | 98.2 | 22.7 | 22.3 | 1.7 |
| Example 10 | 98.3 | 21.5 | 21.1 | 1.9 |
| Example 11 | 99.2 | 25.3 | 23.6 | 6.7 |
| Comparative Example 1 | 99.0 | 27.1 | 21.2 | 21.8 |
| Comparative Example 2 | 98.8 | 19.6 | 17.2 | 12.0 |

As can be seen from Table I, the coated membranes of Examples 1-11 all exhibited a considerably smaller decrease in flux in the presence of the fouling agent (30 ppm dry milk) than did the uncoated membrane (Comparative Example 1) and the membrane treated with TOTDA (Comparative Example 2). This is advantageous because, as noted above, a consistency in flux over a long period of time is highly desirable since it obviates the need to continuously vary the operating pressure and to wash the membrane to remove fouling agents therefrom. It should also be recognized that, whereas the final flux in the present case was measured only after four hours of use, such membranes are expected to be continuously used for considerably longer periods of time. Accordingly, the final flux values given above are much more representative of the flux properties of the membranes over their respective lifetimes of use than are the initial flux values.

Also, it should be noted that, when the coated membranes were washed following their four-hour period of use, their respective fluxes substantially returned to their initial fluxes whereas the untreated membrane, when washed following its four-hour period of use, only approached about 85% of its initial flux.

In addition, it should be noted that the coated membranes of Examples 1-11 all exhibited an improvement in flux, both initially and in the presence of the fouling agent, as compared to the coated membrane of Comparative Example 2. The coated membrane of Example 11 may carry more negative charge than the membranes of Examples 1-10 due to the presence of the glycine derivatives in the coated membrane of Example 11. This may explain why it appears to have become more fouled by dry milk (which carries some positive charges) than the membranes of Examples 1-10. On the other hand, the membrane of Example 11 may be more resistant to a fouling agent having a negative charge.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A composite polyamide reverse osmosis membrane, said composite polyamide reverse osmosis membrane comprising:
   (a) a microporous support;
   (b) a polyamide layer on said microporous support, said polyamide layer being the interfacial reaction product of a polyfunctional amine and a polyfunctional acyl halide; and
   (c) a hydrophilic coating on said polyamide layer, said hydrophilic coating being formed by covalently bonding a hydrophilic compound to the polyamide layer, wherein said hydrophilic compound includes (i) at least one reactive group, said at least one reactive group being at least one of a primary amine and a secondary amine, said at least one reactive group being covalently bonded directly to the polyamide layer through the reaction of said at least one reactive group with a residual acyl halide of the polyamide layer to form an amide group; and (ii) at least one non-terminal hydroxyl group.

2. The composite polyamide reverse osmosis membrane as claimed in claim 1 wherein the at least one non-terminal hydroxyl group comprises at least two non-terminal hydroxyl groups.

3. The composite polyamide reverse osmosis membrane as claimed in claim 1 wherein the at least one non-terminal hydroxyl group comprises a single non-terminal hydroxyl group.

4. The composite polyamide reverse osmosis membrane as claimed in claim 1 wherein the hydrophilic compound is a reaction product of an epoxide and at least one of ammonia and an amine.

5. The composite polyamide reverse osmosis membrane as claimed in claim 4 wherein the hydrophilic compound is the reaction product of an epoxide and ammonia.

6. The composite polyamide reverse osmosis membrane as claimed in claim 5 wherein the epoxide is selected from the group consisting of glycidol, butadiene diepoxide, ethylene glycol diglycidyl ether, 1,3-propanediol diglycidyl ether, 1,4-butanediol diglycidyl ether, 1,5-pentanediol diglycidyl ether, 1,6-hexanediol diglycidyl ether, 1,4-cyclohexanedimethanol diglycidyl ether, 1,4-cyclohexanediol diglycidyl ether, 1,3-cyclohexanediol diglycidyl ether, glycerol diglycidyl ether, glycerol triglycidyl ether, diglycerol polyglycidyl ether, polyglycerol polyglycidyl ether, 1,1,1-tris(hydroxymethyl) ethane triglycidyl ether, 1,1,1-tris(hydroxymethyl)ethane diglycidyl ether, trimethylolpropane diglycidyl ether, trimethylolpropane triglycidyl ether, phloroglucinol triglycidyl ether, pyrogallol triglycidyl ether, cyanuric acid triglycidyl ether, pentaerythritol tetra glycidyl ether, sorbitol tetraglycidyl ether, hydroquinone diglycidyl ether, resorcinol diglycidyl ether, bisphenol A diglycidyl ether, poly(ethylene glycol) diglycidyl ether, and polypropylene glycol) diglycidyl ether.

7. The composite polyamide reverse osmosis membrane as claimed in claim 6 wherein the epoxide is a poly(ethylene glycol) diglycidyl ether.

8. The composite polyamide reverse osmosis membrane as claimed in claim 6 wherein the epoxide is a polypropylene glycol) diglycidyl ether.

9. The composite polyamide reverse osmosis membrane as claimed in claim 5 wherein the hydrophilic compound is selected from the group consisting of the reaction product of ammonia and nona(ethylene glycol) diglycidyl ether; 4,7,10-Trioxa-2,12-dihydroxy-1,13-tridecanediamine; $NH_2-CH_2-CH(OH)-CH_2O-(CH_2-CH_2-O)_4-CH_2-CH(OH)-CH_2-NH_2$; $NH_2-CH_2-CH(OH)-CH_2O-(CH_2-CH_2-O)_{13}-CH_2-CH(OH)-CH_2-NH_2$; $NH_2-CH_2-CH(OH)-CH_2O-(CH_2-CH_2-O)_{22}-CH_2-CH(OH)-CH_2-NH_2$; the reaction product of ammonia and glycerol triglycidyl ether; and the reaction product of ammonia and sorbitol tetraglycidyl ether.

10. The composite polyamide reverse osmosis membrane as claimed in claim 4 wherein the hydrophilic compound is the reaction product of an epoxide and an amine.

11. The composite polyamide reverse osmosis membrane as claimed in claim 10 wherein said amine is of the formula $R-NH_2$ wherein R is selected from the group consisting of an alkyl group, an allyl group, a benzyl group, a phenyl group, a hydroxyl group, a carbonyl group, a nitrile group, a trialkoxysilane group, an anionic group, a tertiary amine group, and a polyalkylene oxide group.

12. The composite polyamide reverse osmosis membrane as claimed in claim 11 wherein said amine is selected from the group consisting of methylamine, ethylamine, propylamine, and butylamine.

13. The composite polyamide reverse osmosis membrane as claimed in claim 11 wherein said amine is selected from the group consisting of ethanolamine, 2-amino-1-propanol, 3-amino-1-propanol, 2-amino-1-butanol, 4-amino-1-butanol, 2-amino-1-pentanol, 6-amino-1-pentanol, 2-amino-1-hexanol, 6-amino-1-hexanol, aminophenol, 1,3-diamino-2-propanol, 2,3-dihydroxy-1,4-butanediamine, 3-amino-1,2-propanediol, glucamine, and tris(hydroxymethyl)aminomethane.

14. The composite polyamide reverse osmosis membrane as claimed in claim 11 wherein said amine is selected from the group consisting of aminoacetaldehyde diethyl acetal, aminoacetaldehyde dimethyl acetal, 4-aminobutyraldehyde diethyl acetal, α-aminobutyrolactone, 3-aminobenzamide, 4-aminobenzamide, and N-(3-aminopropyl)-2-pyrrolidinone.

15. The composite polyamide reverse osmosis membrane as claimed in claim 11 wherein said amine is selected from the group consisting of aminoacetonitrile, 2-aminobenzonitrile, 3-aminobenzonitrile, and 4-aminobenzonitrile.

16. The composite polyamide reverse osmosis membrane as claimed in claim 11 wherein said amine is selected from the group consisting of (3-aminopropyl)triethoxysilane and (3-aminopropyl)trimethoxysilane.

17. The composite polyamide reverse osmosis membrane as claimed in claim 11 wherein said amine is selected from the group consisting of glycine, taurine, 3-aminopropanoic acid, 3-amino-1-propanesulfonic acid, 4-amino-1-butanesulfonic acid, 2-aminoethyl hydrogen sulfate, 3-aminobenzenesulfonic acid, 3-amino-4-hydroxybenzenesulfonic acid, 4-aminobenzenesulfonic acid, 3-aminopropylphosphonic acid, 3-amino-4-hydroxybenzoic acid, 4-amino-3-hydroxybenzoic acid, 6-aminohexanoic acid, 3-aminobutanoic acid, 4-amino-2-hydroxybutyric acid, 4-aminobutyric acid, and glutamic acid.

18. The composite polyamide reverse osmosis membrane as claimed in claim 11 wherein said amine is selected from the group consisting of 3-(dimethylamino)propylamine, 3-(diethylamino)propylamine, 4-(2-aminoethyl)morpholine, 1-(2-aminoethyl)piperazine, 3,3'-diamino-N-methyldipropylamine and 1-(3-aminopropyl)imidazole.

19. The composite polyamide reverse osmosis membrane as claimed in claim 10 wherein said amine is a compound having the formula:

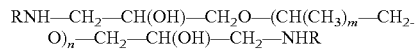

wherein R is hydrogen or an alkyl or alkenyl group or an aryl group having from 1 to 8 carbon atoms (R preferably being hydrogen, methyl or ethyl) or can contain other functional groups selected from the group consisting of a hydroxyl group, a carbonyl group, a nitrile group, a trialkoxysilane group, an anionic group, and a tertiary amino group, wherein n is an integer ranging from 1 to 2000 when m is 0; and wherein n is an integer ranging from 1 to 200 when m is 1.

20. The composite polyamide reverse osmosis membrane as claimed in claim 10 wherein said epoxide is selected from the group consisting of glycidol, butadiene diepoxide, ethylene glycol diglycidyl ether, 1,3-propanediol diglycidyl ether, 1,4-butanediol diglycidyl ether, 1,5-pentanediol diglycidyl ether, 1,6-hexanediol diglycidyl ether, 1,4-cyclohexanedimethanol diglycidyl ether, 1,4-cyclohexanediol diglycidyl ether, 1,3-cyclohexanediol diglycidyl ether, glycerol diglycidyl ether, glycerol triglycidyl ether, diglycerol polyglycidyl ether, polyglycerol polyglycidyl ether, 1,1,1-tris(hydroxymethyl)ethane triglycidyl ether, 1,1,1-tris(hydroxymethyl)ethane diglycidyl ether, trimethylolpropane diglycidyl ether, trimethylolpropane triglycidyl ether, phloroglucinol triglycidyl ether, pyrogallol triglycidyl ether, cyanuric acid triglycidyl ether, pentaerythritol tetra glycidyl ether, sorbitol tetraglycidyl ether, hydroquinone diglycidyl ether, resorcinol diglycidyl ether, bisphenol A diglycidyl ether, poly(ethylene glycol) diglycidyl ether, and poly(propylene glycol) diglycidyl ether.

21. The composite polyamide reverse osmosis membrane as claimed in claim 20 wherein the epoxide is a poly(ethylene glycol) diglycidyl ether.

22. The composite polyamide reverse osmosis membrane as claimed in claim 20 wherein the epoxide is a poly(propylene glycol) diglycidyl ether.

23. The composite polyamide reverse osmosis membrane as claimed in claim 10 wherein the hydrophilic compound is selected from the group consisting of the reaction product of aminoacetaldehyde dimethylacetal (AADA) and nona(ethylene glycol) diglycidyl ether; the reaction product of ethanolamine (ELA) and nona(ethylene glycol) diglycidyl ether; the reaction product of (3-aminopropyl)triethoxysilane (APTS) and nona(ethylene glycol) diglycidyl ether; and the reaction product of glycine and nona(ethylene glycol) diglycidyl ether.

24. The composite polyamide reverse osmosis membrane as claimed in claim 1 wherein said polyfunctional acyl halide is a polyfunctional acid chloride.

* * * * *